United States Patent
Dore et al.

(10) Patent No.: US 8,194,591 B2
(45) Date of Patent: Jun. 5, 2012

(54) COMMUNICATION METHODS IN A NETWORK

(75) Inventors: Renaud Dore, Rennes (FR); Patrick Fontaine, Rennes (FR); Ludovic Jeanne, Rennes (FR); Yvon Legallais, Rennes (FR)

(73) Assignee: Thomson Licensing, Boulogne, Billancourt (FR)

( * ) Notice: Subject to any disclaimer, the term of this patent is extended or adjusted under 35 U.S.C. 154(b) by 755 days.

(21) Appl. No.: 12/317,308

(22) Filed: Dec. 22, 2008

(65) Prior Publication Data
US 2009/0225698 A1    Sep. 10, 2009

(30) Foreign Application Priority Data

Dec. 21, 2007   (FR) ..................... 07 60271

(51) Int. Cl.
*H04W 36/02* (2009.01)
*H04W 36/30* (2009.01)
*H04W 28/14* (2009.01)

(52) U.S. Cl. .................. 370/328; 370/338; 455/442

(58) Field of Classification Search .................. 370/328, 370/331, 332, 333, 338; 455/422.1, 436, 455/437, 439, 442
See application file for complete search history.

(56) References Cited

U.S. PATENT DOCUMENTS

| | | | |
|---|---|---|---|
| 2001/0046875 A1* | 11/2001 | Davies | 455/507 |
| 2003/0125067 A1* | 7/2003 | Takeda et al. | 455/522 |
| 2003/0224786 A1* | 12/2003 | Lee et al. | 455/432.1 |
| 2006/0193272 A1 | 8/2006 | Chou et al. | |
| 2008/0144552 A1* | 6/2008 | Johansson et al. | 370/310 |
| 2008/0240018 A1* | 10/2008 | Xue et al. | 370/328 |
| 2009/0042572 A1* | 2/2009 | Craig et al. | 455/436 |

FOREIGN PATENT DOCUMENTS

| | | |
|---|---|---|
| EP | 0891114 | 1/1999 |
| EP | 1320274 | 6/2003 |
| WO | WO03/085902 | 10/2003 |
| WO | WO2006/130063 | 12/2006 |

OTHER PUBLICATIONS

French Search Report dated Dec. 21, 2007.

* cited by examiner

*Primary Examiner* — Chi Pham
*Assistant Examiner* — Ahmed Elallam
(74) *Attorney, Agent, or Firm* — Jeffrey D. Carter (57) ABSTRACT

Communication method in a network (1), of data being transmitted from a wireless master station (10) to a recipient station (14) via one of the wireless slave stations (10 to 12). In order to guarantee a quality of service, the method comprises a first election of a first slave station, then a first transmission of at least one data packet present in the first queue, the first transmission being carried out from the master station to the first slave station, a second election of a second slave station, then a second transmission of at least one data packet present in the second queue, the second transmission being carried out from the master station to a second slave station and the first transmission continuing as long as the first queue is not empty.

6 Claims, 7 Drawing Sheets

COMMUNICATION METHODS IN A NETWORK

This application claims the benefit, under 35 U.S.C. §119 of European Patent Application No. 07301671.9, filed Dec. 13, 2007.

1. FIELD OF THE INVENTION

The present invention relates to the field of wireless telecommunications and more precisely the reliable exchange of data between one mobile station and several mobile stations via two relay stations.

2. TECHNOLOGICAL BACKGROUND

According to the prior art, several network architectures are known. Some of them are based on a centralised architecture. Hence, the Wi-Fi system (based on the IEEE 802.11a standard) has a non-centralised task sequencing architecture (or scheduling) with a contention channel access. Such an architecture does not enable a sufficient Quality of Service (or QoS) to be managed effectively for some applications. The Wimax system (based on the IEEE 802.16 standard) possesses a centralised scheduling architecture, which allows the implementation of a more appropriate quality of service for certain applications (maximum delivery time for a packet (typically 5 ms) and bandwidth guaranteed for each connection request).

Nevertheless, the techniques implemented in the Wimax networks do not enable a quality of service to be guaranteed for all the applications, for example for video type communications, data being received by wireless cameras moving around in noisy radio-frequency environments, subject to interference or disturbed by obstacles creating signal losses or echoes. Hence, a communication with a wireless station can be cut off suddenly (for example, when the mobile station is moving around). Indeed, the support or the coverage of a wireless link cannot be guaranteed, which may cause reception problems when a station or its environment moves.

In cell networks, mobile stations communicating with a base station in a cell are used. When a mobile phone moves from one cell to another, a mobile station associates with another base station according to a handover procedure. The disadvantage of the known techniques is that they are not suitable for maintaining the communication without interruption for some applications (particularly for applications with very high bitrate and in real time, e.g. for video data transmissions of mobile cameras to a fixed node).

3. SUMMARY OF THE INVENTION

The purpose of the invention is to overcome the disadvantages of the prior art.

More particularly, the purpose of the invention is to enable the emission and/or reception of data by at least one mobile wireless station intended for or coming from a remote node with a guaranteed quality of service and more specifically with an absence of cutting off of the communication (namely, with no loss of packets sent) under normal conditions of use.

The invention relates to a communication method in a network comprising a wireless master station and a plurality of wireless slave stations, data being transmitted from the master station to a recipient station via one of the slave stations, the method being implemented by the master station. In order to guarantee the quality of service, the method comprises:

a first election of a first slave station, then
a queuing in a first queue of data packets intended for a remote station, the first queue being associated with the first slave station,
a first transmission of at least one data packet present in the first queue, the first transmission being carried out from the master station to the first slave station,
a second election of a second slave station, then
a queuing in a second queue of data packets intended for a remote station, the second queue being associated with the second slave station,
a second transmission of at least one data packet present in the second queue, the second transmission being carried out from the master station to a second slave station and the first transmission continuing as long as the first queue is not empty.

A master station is defined as a station that decides on the election of a slave station, this station being given priority for the transmission of data packets intended for or coming from the master station.

Advantageously, the method comprises a selection step of a slave station for an election according to a predetermined criterion.

According to a particular characteristic, the method comprises:

a reception step by the master station of an item of information representative of the reception quality of radio frames transmitted by the master station and received by at least one slave station,
a comparison step of the information received, and
an election step of a slave station, the elected slave station corresponding to the best reception quality.

According to another characteristic, the method comprises:

a determination step by the master station of an item of information representative of the reception quality of radio frames transmitted by at least one slave station and received by the master station,
a comparison step of the information received, and
an election step of a slave station, the elected slave station corresponding to the best reception quality.

According to a particular characteristic, the data packets are of MAC level and are compatible with the IP protocol (Internet Protocol).

Indeed, the invention enables the transmission and reception of data packets by avoiding IP packet duplications and by avoiding problems of routing IP packets that would be duplicated and would transit by the different stations (called slaves according to the invention).

Viewed from the slave station side, the invention relates to a communication method in a network comprising a wireless master station and a plurality of wireless slave stations, data being transmitted from the first station to a recipient station via the slave stations, the method being implemented by one of said slave stations, referred to as current station. According to the invention, the method comprises:

a detection step of the current station,
a reception step of data packets intended for the master station, and
a transmission step of the packets received to the master station.

Advantageously, the method comprises:

a reception step of an item of information representative of the election of a different slave station from the current station, then
a reception step of data packets intended for the master station, and
an elimination step of the packets received, the packets received not being transmitted to the master station by the current station.

4. LIST OF FIGURES

The invention will be better understood, and other specific features and advantages will emerge upon reading the following description, the description making reference to the annexed drawings wherein.

5. DETAILED DESCRIPTION OF THE INVENTION

Figure 1:
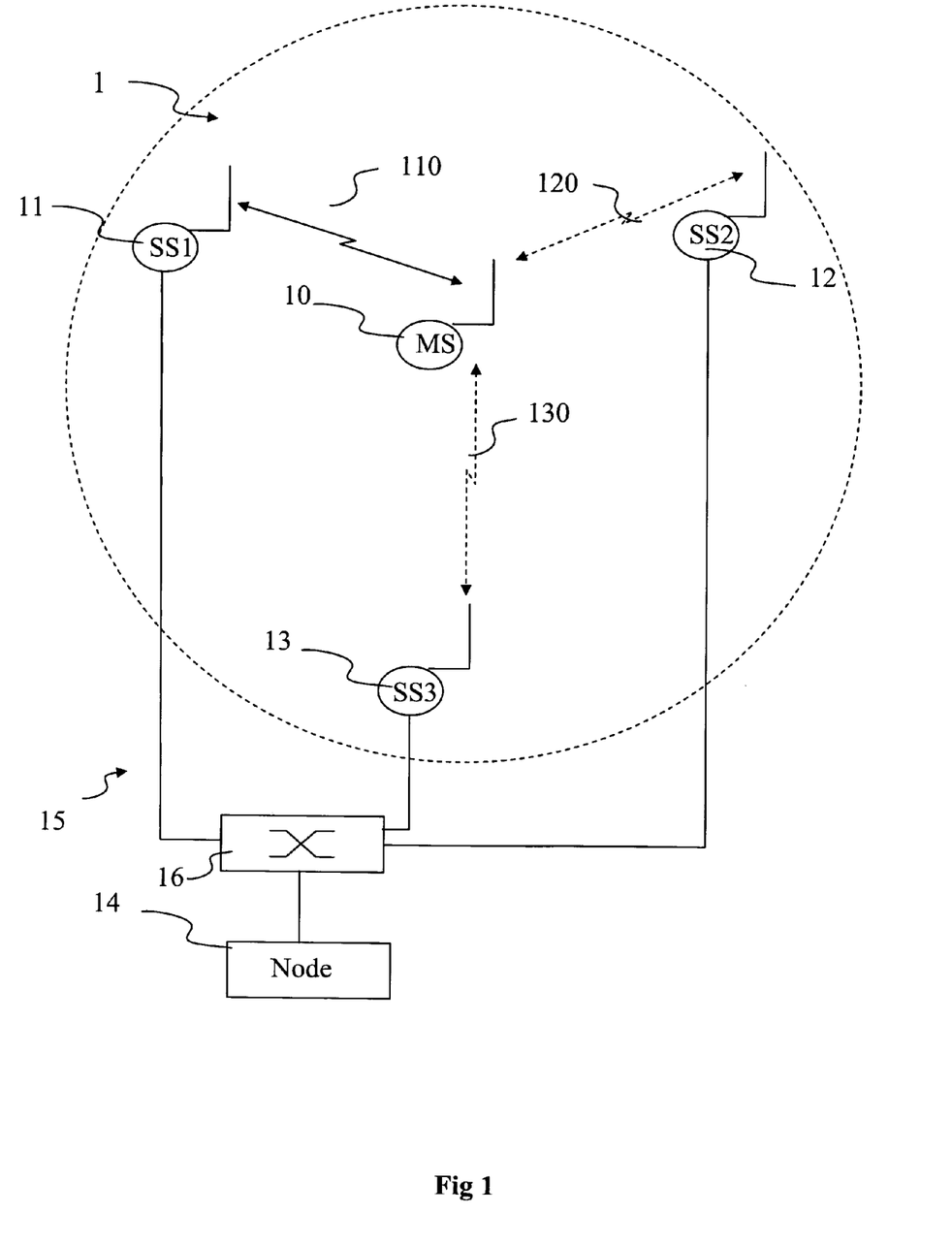
FIG. 1 illustrates an example of a communication network architecture with elements implementing the invention, FIGS. 2 and 3 diagrammatically show, respectively, a mobile wireless master station and a relay slave station belonging to the network of FIG. 1, according to a particular embodiment of the invention.

FIG. 1 shows a communication network comprising a wireless network 1 and a wired Ethernet network (or IEEE 802.3) 15.

The wireless network 1 comprises one or more first wireless master stations (MS), fixed or, advantageously mobile. A master station (MS) is for example a MS station 10. If there are several MS stations, they use different physical channels (for example, frequency channels or CDMA (Code Multiple Division Access), temporal allocations (TDMA Time Division Multiple Access)).

The Ethernet network 15 comprises a node 14 source or destination of data packets (or SDU) transmitted from or to the MS10.

Master station 10 can transmit or receive data intended for (for example images) or coming from (for example control data) node 14 via the relay slave stations or subscriber stations (SS standing for "Slave Stations" or RS standing for "Remote Stations") SS1 11, SS2 12 and SS3 13 (second wireless network stations). The subscriber stations 11 to 13 allow the interface between the wireless network 1 and the Ethernet network to be provided. Hence, the station SS 11 (12, 13 respectively) is connected via a bidirectional wireless link 110 (120, 130 respectively) to the station MS 10. The network architecture 1 is such that the network 1 comprises enough slave stations to cover the entire zone in which the master station or stations are likely to be found. Hence, at any time, each master station of the network 1 is connected to at least one slave station by a wireless link enabling a wireless communication to be provided. The slave stations 11 to 13 are connected via a switch 16 by an Ethernet link (or any other network enabling the transmission and the reception of data) to the node 14. According to an embodiment variation, they are also connected to each other via a network link (or any other type of wired or wireless link). Hence, for example, if the master station 10 is connected to the slave station SS1 11, it can receive the data transmitted by the node 14 via the Ethernet network 15 and the wireless link 110. According to another variant the node 14 is connected directly to the slave stations 11 to 13.

The master station or stations are for example mobile cameras, equipped with wireless communication means and the node 14 is an image processing system (for example, a video recorder, a studio entry point etc.). Hence, the FIG. 1 network enables a continued (i.e. without interruption) control data transmission by a processing system to cameras located on the interior or the exterior of buildings for retransmitting any event (for example a sporting event or a show) on an equally nondescript geographic zone. The master station can understand a device or be associated within a data packet reception system to a device, the device being suitable to capture audio-visual data (for example, camera), the master station transmitting the packets received from the device. These packets comprise, for example, control information from the device.

Advantageously, the slave stations share the same radio frequency channel, the radio spectrum being a resource to be economised. The subscriber stations can possibly listen mutually to each other on the radio channel. According to an embodiment variation, the subscriber stations cannot listen mutually to each other on the radio channel.

Advantageously, the communications used between the nodes of the network of FIG. 1 are of the IP type (Internet Protocol), the SS, the MS and the node 14 each having an IP address. IP is used to transport the flow in streaming mode, for example for transporting video and/or audio in unidirectional or bidirectional mode.

Each of the wireless links 110, 120 and 130 is associated with an upward connection (from the corresponding SS to the MS station) and with a downward connection (from the MS to the corresponding SS). During the data packet transmission, a connection identifier enables the associated SS to be identified.

Figure 2:
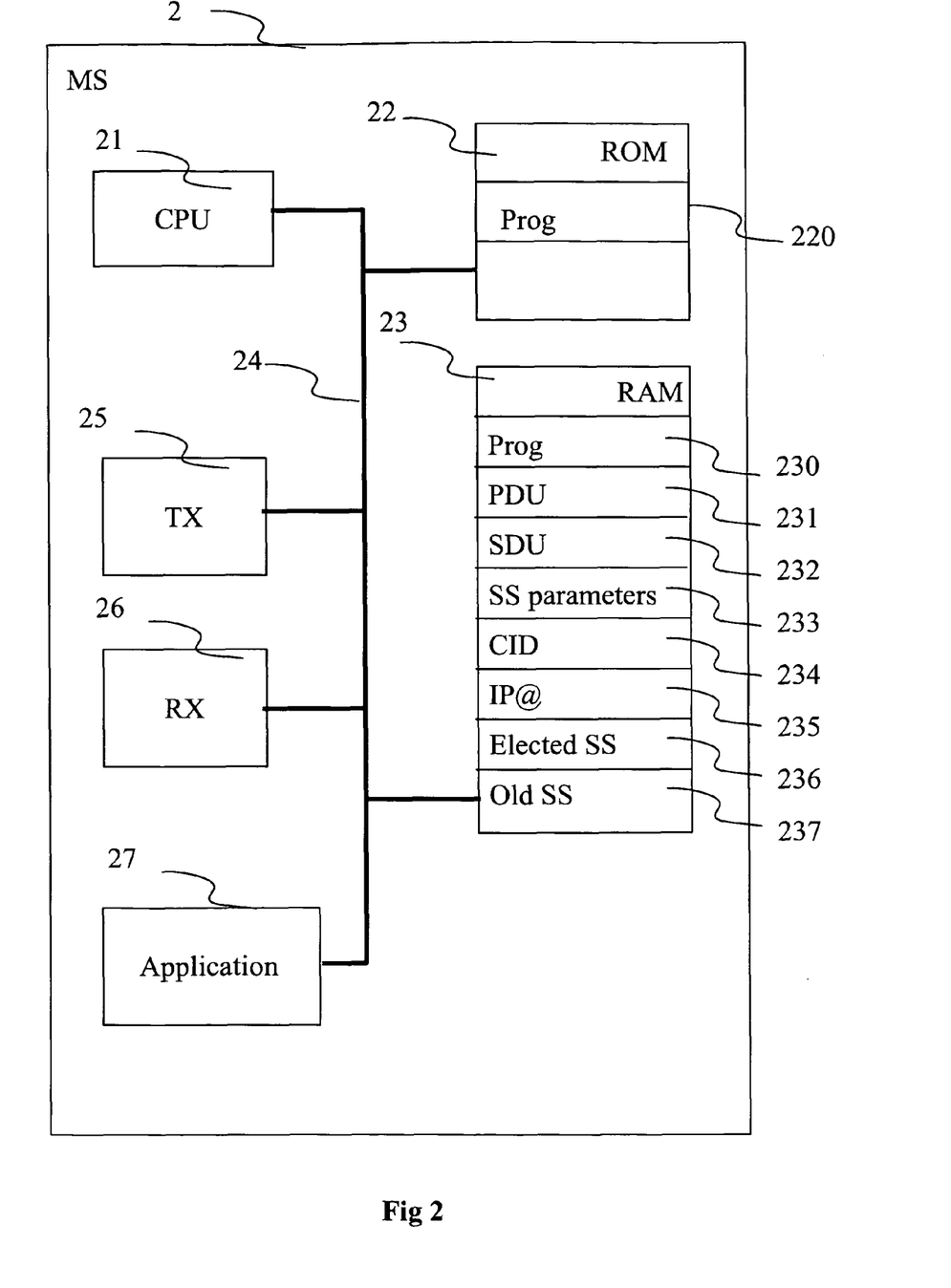

FIG. 2 diagrammatically shows a master mobile station 2 of the network 1 corresponding to the MS 10.

The master station 2 comprises, connected to each other by an address and data bus 24, also transporting a clock signal:
- a microprocessor 21 (or CPU),
- a ROM memory (Read Only Memory) 22,
- a RAM memory (Random Access Memory) 23,
- a transmission module 25 of a signal on the wireless link,
- a reception module 26 of a signal on the wireless link, and
- an interface 27 to an application.

It is noted that the word "register" used in the description of memories 22 and 23 designates in each of the memories mentioned, a memory zone of low capacity (some binary data) as well as a memory zone of large capacity (enabling a whole programme to be stored or all or part of the data representing an audio/video service received).

The application is, for example, of the video type and constitutes respectively the source and destination of the data respectively transmitted and received by the master station 2 (the master station 2 is for example a camera or a radio system associated with the camera).

The ROM memory 22 notably comprises a "prog" programme 220.

The algorithms implementing the steps of the method specific to the invention and described below are stored in the ROM 22 memory associated with the mobile station 2 implementing these steps. When powering up, the microprocessor 21 loads and executes the instructions of these algorithms.

The RAM 23 particularly comprises:
- in a register 230, the operating programme of the microprocessor 21 responsible for switching on the mobile station 2,
- the data or the PDUs ("Packet Data Unit") corresponding to the data packets of level 2 or MAC ("Medium Access Control") containing this data in a register 231,
- data packets of the SDU type ("Service Data Unit" that are MAC level data packets and are compatible with the IP protocol) being able to contain several PDUs in a register 232 parameters associated with each of the SS 11 to 13 in a register 233, and particularly a MAC level address (or SSID, meaning Slave Station Identifier) and parameters of association with the MS, one or more connection identifiers or CID in a register 234, an IP address of the mobile station 2 in a register 235, an elected slave station identifier in a register 236, and an identifier of an old elected slave station (and replaced by the elected slave station) with which data packets are exchanged in a register 237.

Figure 3:
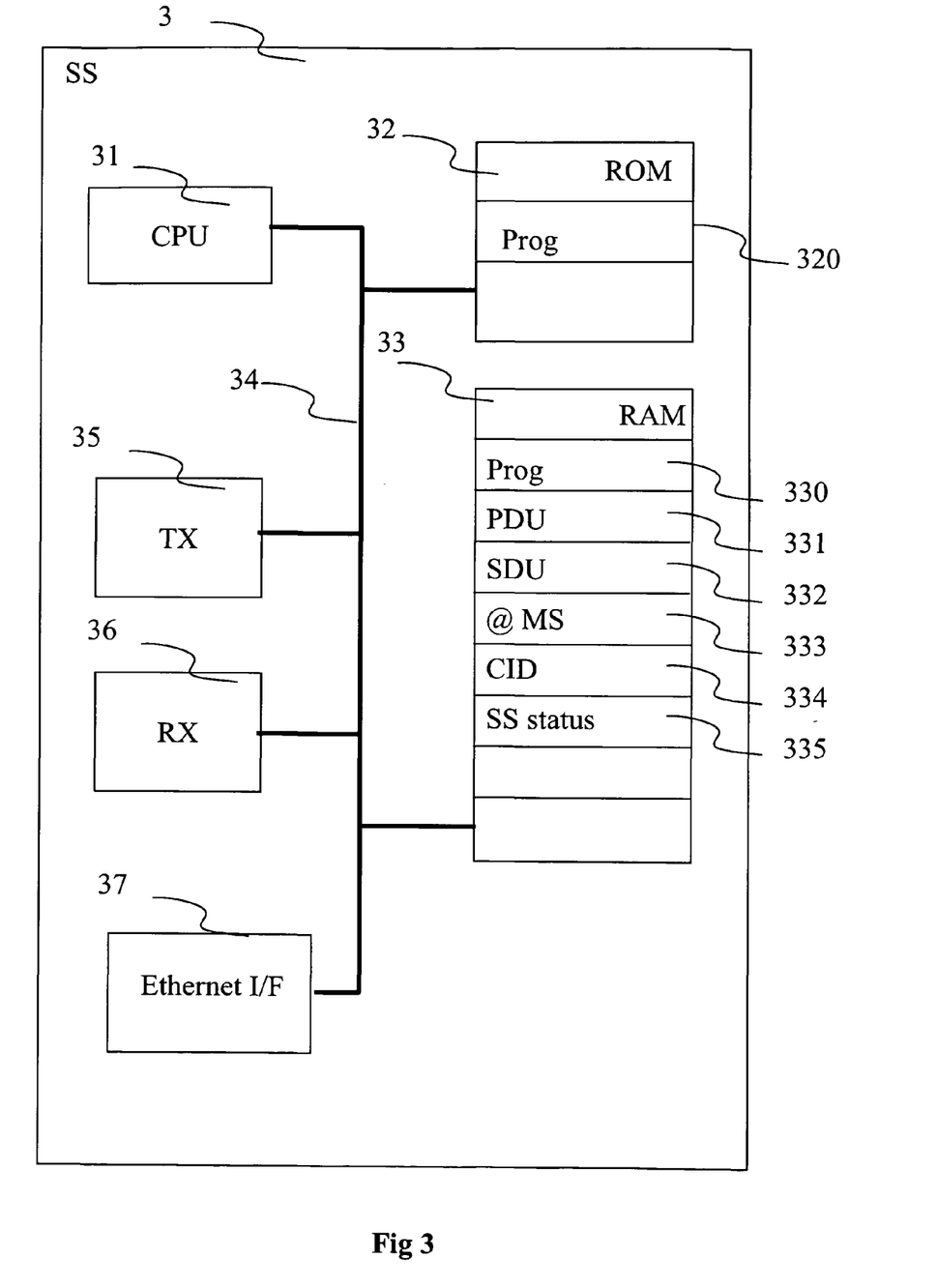

FIG. 3 diagrammatically illustrates a slave station 3 of the network 1 corresponding to SS1, SS2 or SS3.

The slave station 3 comprises, connected to each other by an address and data bus 34, also transporting a clock signal:

a microprocessor 31 (or CPU), a ROM memory (Read Only Memory) 32, a RAM memory (Random Access Memory) 33, a transmission module 35 of a signal on the wireless link, a reception module 36 of a signal on the wireless link, and an interface 37 to an Ethernet network.

It is noted that the word "register" used in the description of memories 32 and 33 designates in each of the memories mentioned, a memory zone of low capacity (some binary data) as well as a memory zone of large capacity (enabling a whole programme to be stored or all or part of the data representing an audio/video service received).

The ROM memory 32 notably comprises a "prog" programme 320.

The algorithms implementing the steps of the method specific to the invention and described below are stored in the ROM 32 memory associated with the subscriber station 3 implementing these steps. When powering up, the microprocessor 31 loads and executes the instructions of these algorithms.

The RAM 33 particularly comprises:

in a register 330, the operating programme of the microprocessor 31 responsible for switching on the subscriber station 3, data or PDUs containing this data in a register 331, data packets of type SDU ("Service Data Unit") being able to contain several PDU in a register 332 the MAC and IP addresses of the master station or stations able to communicate with the station 3 (or associated master stations) in a register 333, a connection identifier or CID in a register 334, and the status (elected station or not) of the station 3 in a register 335.

Figure 4:
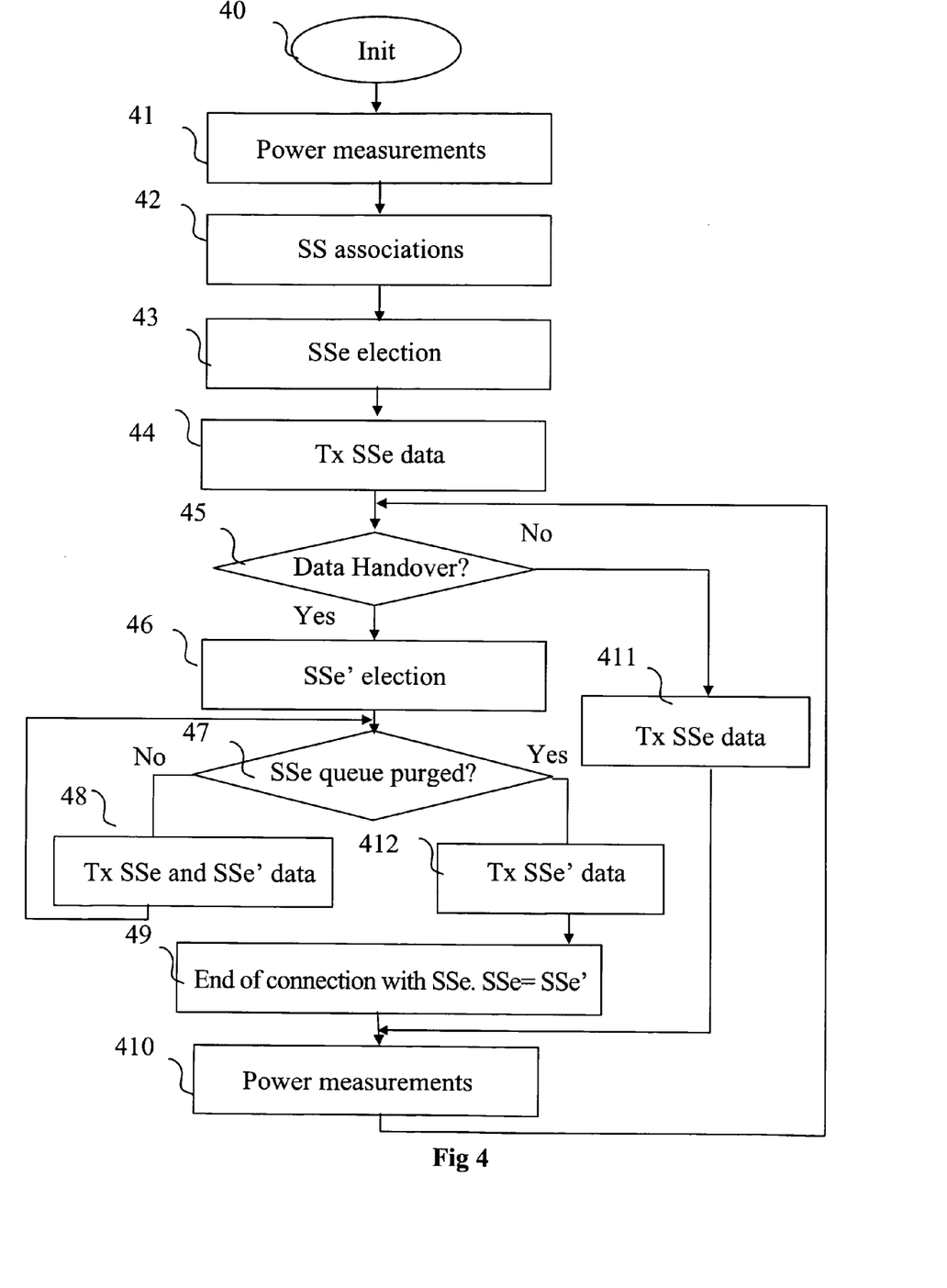
FIG. 4 shows a method used in the master station of FIG. 2, according to particular embodiments of the invention, FIGS. 5 to 7 diagrammatically illustrate the data packet exchanges between the elements of the network of FIG. 1, and FIGS. 8 and 9 give examples of communication protocol used for the exchange of frames between the elements of the network of FIG. 1.

FIG. 4 shows a method used in the master station 2 according to a particular implementation of the invention.

This method begins with an initialisation phase 40 during which the different parameters of the station 2 are updated.

Then, during a step 41, the station 2 measures the reception power of the signals transmitted by each of the SS stations. According to a variant, the station 2 measures the reception quality of these signals (this quality being characterised, for example, by a signal-to-noise ratio and/or a frame or bit error rate).

Next, during a step 42, the station 2 associates the SS stations for which the power level is sufficient (if for example, it is greater than or equal to a determined threshold). According to a variant, the station 2 associates the SS stations for which the reception quality is sufficient.

Then, during a step 43, the station 2 elects an SS station, noted SSe according to a determined criterion (for example, the station for which the quality of the communication is the best in the upward (reception quality by the master station of radio frames sent by an SS) and/or downward (reception quality by an SS of radio frames sent by the master station) direction, or the one that has the most capacity. A connection is then opened between SSe and the station 2.

Next (for example, after a determined time or during any event (particularly loss of quality in the communication with SSe or advantageously on transmission of each radio frame)), during a step 45, the master station checks whether a change of elected station (or handover) is necessary (or possible) (by carrying out a new measurement similar to the measure of the step 41 if the age of the last measurement is greater than a determined value or if its results are obsolete).

In the negative, during a step 411, no change of elected station being necessary, the master station 2 transmits the data to the elected station SSe, particularly PDU or PDUs from an SDU received by the station 2. An SDU comprises one or more PDUs and the transmission of the data to the elected station is carried out PDU by PDU. On reception of an SDU coming from a device (included in the station 2 or associated with this station 2), the master station places the PDU or PDUs in a transmission queue associated with the elected station SSe.

In the affirmative, during a step 46, the master station elects another slave station, noted SSe', according to a determined criterion (that can be the same or different from the criterion used in step 43). A connection is then opened between SSe' and the station 2.

Then, during a test 47, the master station checks whether the transmission queue associated with the elected station SSe is empty.

In the negative, during a step 48, the master station transmits to SSe a PDU present in the transmission queue associated with SSe and to SSe' a PDU present in the transmission queue associated with SSe'. Hence, the transmission of the PDUs to the SS is maintained without interruption during a handover of elected SS, the transmission queue to SSe being gradually purged whereas the transmission to SSe', newly elected station, begins. In this manner, in contrast to the prior art, the station handover procedure for the transmission of data is carried out without interrupting the data transmission, even if the bitrate of the data is very high. This is particularly advantageous for applications sensitive to transmission interruptions (for example, data transmission of the high bitrate and real time video type of the master station 2 to a wired network destination). Next, the test 47 is reiterated.

In the affirmative, the transmission queue of SSe being empty, during a step 412, the master station transmits data to SSe' (PDU present in the transmission queue of SSe').

Then, during a step 49, the master station terminates the connection with the previously elected station SSe and the station SSe' becomes the only elected station SSe.

Following one of the steps 411 or 49, during a step 410, a power measurement similar to the one of step 41 is carried out and the test 45 is repeated.

Viewed from the slave station side, according to the invention, a slave station implements the communication method comprising:

an election, the slave station considering itself to be elected by reception of information representative of this election and transmitted by the master station, a reception of data packets intended for the master station and transmitted for example by the node 14, these packets being able to be of the "broadcast" or "unicast" type, and a transmission of the packets received to the master station.

When a slave station receives an item of information representative of the election of another slave station directly from the master station or via the elected slave station, it deletes the data packets received and intended for the master station, the packets received without being transmitted to the master station by the non-elected station.

Figure 5:
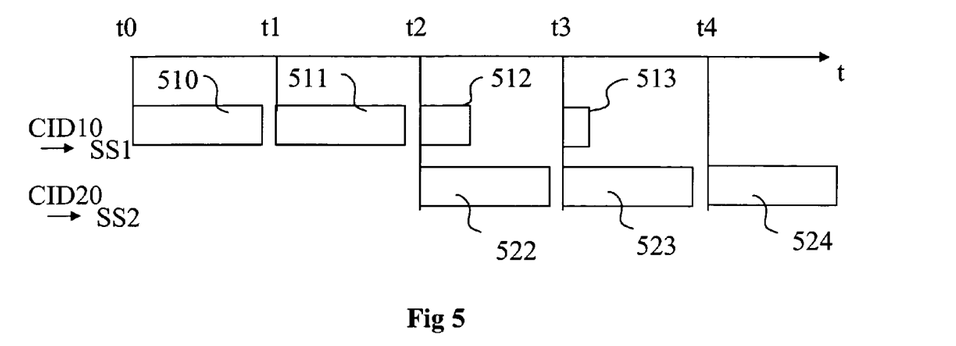

FIG. 5 illustrates a PDU transmission scenario of the master station 2 to two SS noted as SS1 and SS2 during the time t, the SDUs containing these PDU being intended for the node 14. It is assumed that the connections in the downward direction are respectively CID10 and CID 20 for SS1 and SS2.

Before a time t0, it is assumed that the station SS1 is the only elected station and that the connection CID 10 is open. It is assumed that at to, SS1 transmits a PDU 510 belonging to a SDU composed of four PDUs 510 to 513.

Hence, at to then at t1, the master station transmits over the connection CID 10 the PDUs respectively 510 and 511.

It is assumed that after t1, the master station elects SS2, opens the connection CID 20 then receives another SDU composed of PDUs 522 to 524. It then places these PDUs in the transmission queue associated with SS2. At t2, the master station begins to purge the transmission queue associated with SS1 and transmits the PDU 512 to the station SS1 on the connection CID 10 and begins the transmission to SS2 by transmitting the PDU 522 on the connection CID 20. At t3, the master station finishes purging the transmission queue associated with SS1 and transmits the PDU 513 to the station SS1 on the connection CID 10 and continues the transmission to SS2 by transmitting the PDU 523 on the connection CID 20. At t4, the master station closes the connection CID 10 and continues the transmission to SS2 by transmitting the PDU 524 on the connection CID 20.

Figure 6:
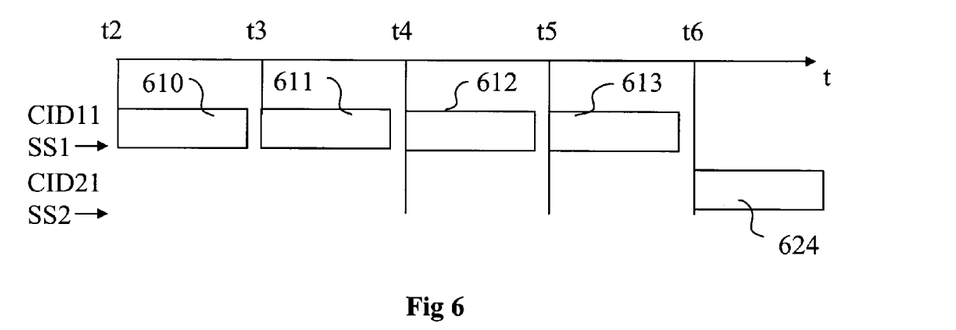

FIG. 6 illustrates a PDU transmission scenario of the point-to-point type (with a unicast type destination address) of SS1 and SS2 to the master station 2 during the time t, the SDUs containing these PDUs being intended for the node 14. It is assumed that the connections in the upward direction are respectively CID11 and CID 21 for SS1 and SS2. Moreover, the hypotheses are the same as for FIG. 5.

According to this scenario, it is the switch 16 that routes the SDUs from the node 14 to the master station 2, either to SS1 or to SS2. This routing is carried out by learning based on an analysis of the traffic. Hence, as long as the switch 16 receives SDUs of the unicast type from the master station 2 to the node 14 via SS1, it will route these SDU in the upward direction via SS1. When the transmissions in the downward direction via SS1 have ended (the transmission then being carried out via SS2), or after a time following this end, the switch 16 will route the SDUs of the unicast type in the upward direction via SS2.

Hence, for the purpose of illustration, the last PDU 513 transmits to the node 14 by SS1 is after t3, the switch 16 changes the routing of the SDU of SS1 to SS2 after a time t5.

If before t2, the switch 16 receives a first SDU composed of two PDUs 610 and 611 then before t4, a SDU comprising a PDU 612 then before t5 a SDU comprising a PDU 613, it routes the three SDU to SS1. SS1 transmits at t2, t3, t4 then t5, the PDUs respectively 610 to 613 in their order of arrival on the connection CID11 to the master station 2.

During the election of SS2, the master station opens the connection CID21 in the upward direction.

Then, from t6, the switch 16 receives an SDU composed of a PDU 624, it routes this SDU to SS2. SS2 then transmits the PDU 624 over the connection CID 21 to the master station. When the master station can no longer receive PDU from the station SS1 (for example after a determined time after reception of the last PDU transmitted by SS1 or after the election of SS2 or even after the reception of a message from SS1 indicating that its transmission queue is empty), it closes the corresponding connection CID 11.

Figure 7:
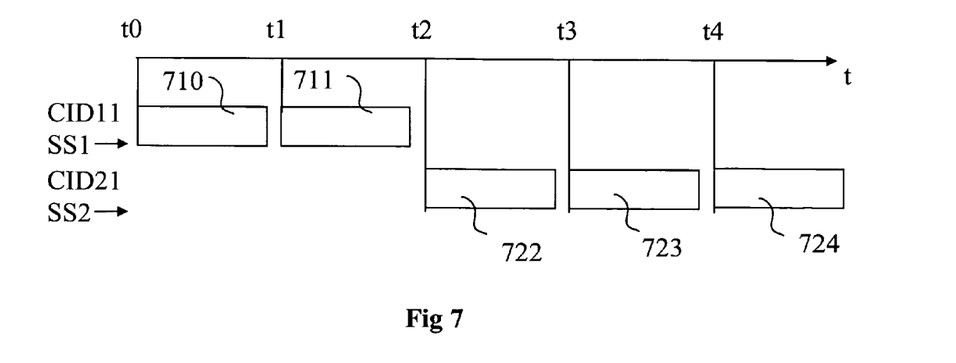

FIG. 7 illustrates a PDU transmission scenario of the broadcast type (with a broadcast type destination address) of SS1 and SS2 to the master station 2 during the time t, the SDUs containing these PDUs being intended for the node 14. It is assumed that the connections in the upward direction are respectively CID11 and CID 21 for SS1 and SS2. Moreover, the hypotheses are the same as for FIGS. 5 and 6.

According to this scenario, the switch 16 routes the SDU of the broadcast type coming from the node 14 to the master station 2, to all the SS stations, without filtering. The SS stations are then the ones that filter the SDUs of the broadcast type. Hence, only the last elected station transmits the SDUs of the broadcast type to the master station. As soon as an elected station is replaced by another station, it ceases to place in its transmission queue to the master station the SDUs of the broadcast type and the new elected station begins to place in its own transmission queue to the master station the SDUs of this type.

Hence, if for the purposes of illustration, SS1 and SS2 are informed of the election of SS2 before t2, PDUs 710 and 711 corresponding to one or more SDUs of the broadcast type are sent by SS1 to the master station over the connection CID 11.

The SDUs of the broadcast type received by SS1 and SS2 after t2 and containing the PDUs 722 to 724 are placed in the transmission queue of SS2 and transmitted over the connection CID 21 to the master station.

To summarise, each SS carries out the following operations:
- if it receives a broadcast type SDU and if it is the last elected station, it places it in its transmission queue and transmits the corresponding PDU or PDUs on the upward connection to the master station,
- if it receives a broadcast type SDU and if it is not the last elected station, it throws away the received SDU without transmitting it,
- if it receives a unicast type SDU addressed to the master station, it places it in its transmission queue and transmits the corresponding PDU or PDUs on the upward connection to the master station.

Figure 8:
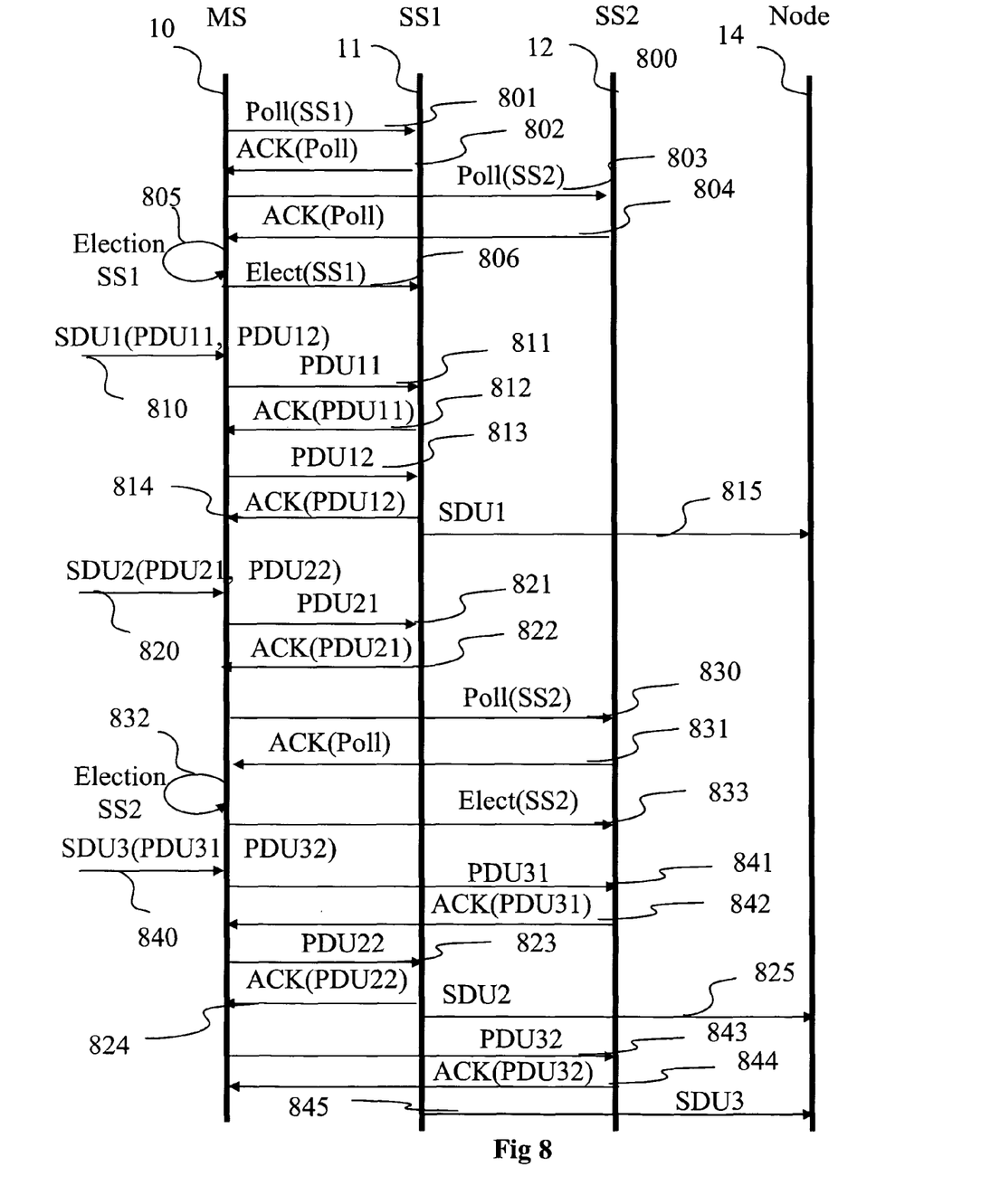

FIG. 8 illustrates an example of communication between the master station 10, the slave stations 11 and 12 (noted respectively as SS1 and SS2) and the node 14 considered as the destination (these elements are represented by vertical lines; the actions, events and/or successive transmissions are chronologically illustrated). In order to facilitate the reading of the example, only two subscriber stations 11 and 12 are mentioned. The example can be extrapolated to any number of master stations and subscriber stations.

The master station polls the presence of each of the slave stations using unicast messages 801 and 802 sent respectively to SS1 and SS2. Each SS receiving this message, acknowledges it with and acknowledgment message respectively 802 and 804. The master station receiving the acknowledgements, the communications in the upward and downward direction are possible with SS1 and SS2 and the associated master station.

The master station then elects during a step 805, the station SS1 (by being based for example on measurements carried out during the reception of the acknowledgements 802 or 804 and/or on information containing measurements carried out during the transmission of the messages 801 and 803 by each of the SSs).

The master station then transmits a dedicated message to SS1 indicating that SS1 is elected. SS2 can also receive this message and record this information.

Next, during a step 810, the master station receives an SDU noted SDU1 comprising two PDUs: PDU11 and PDU12. It places the PDUs in the queue associated with SS1.

Then, it transmits PDU11 to SS1 in a message 811 and receives a corresponding acknowledgement 812.

Next, it transmits PDU12 to SS1 in a message 813 and receives a corresponding acknowledgement 814.

SS1 having received all the PDUs from SDU1, it transmits SDU1 to the destination node 14 in a message 815.

Next, during a step 820, the master station receives an SDU noted SDU2 comprising two PDUs: PDU21 and PDU22. It places the PDUs in the queue associated with SS1.

Then, it transmits PDU21 to SS1 in a message 821 and receives a corresponding acknowledgement 822.

The master station then polls the quality of the reception of SS2 by means of a unicast message 830 addressed SS2. SS2 receiving this message, acknowledges it with an acknowledgement message attesting to a sufficient level of reception quality. According to a variant, this message or a dedicated message transmitted from SS2 to the master station comprises an item of information representative of the reception quality (for example based on the reception of the message 830).

The master station then elects SS2 according to any criterion (for example, the reception quality is better for SS2 than for SS1) in a step 832.

The master station then transmits a dedicated message 833 informing SS2 of its election.

Next, during a step 830, the master station receives an SDU noted SDU3 comprising two PDUs: PDU31 and PDU32. It places the PDUs in the queue associated with SS2, newly elected.

Then, it transmits PDU31 to SS2 in a message 841 and receives a corresponding acknowledgement 842.

Then, it transmits PDU22 (still present in the queue associated with SS1) to SS1 in a message 823 and receives a corresponding acknowledgement 824.

SS1 having received all the PDUs from SDU2, it transmits SDU2 to the destination node 14 in a message 825.

Then, it transmits PDU32 (present in the queue associated with SS2) to SS2 in a message 843 and receives a corresponding acknowledgement 844.

SS2 having received all the PDUs from SDU3, it transmits SDU3 to the destination node 14 in a message 845.

PDUs are mentioned with regard to FIGS. 5 to 6. To enable an easy understanding, it is considered that each of the blocks shown corresponds to a PDU. In fact, advantageously, each of the blocks shown corresponds to a radio frame and advantageously comprises a PDU or a set of several PDUs or even several SDUs. A radio frame can correspond to a unit of time (for example worth 5 ms).

Figure 9:
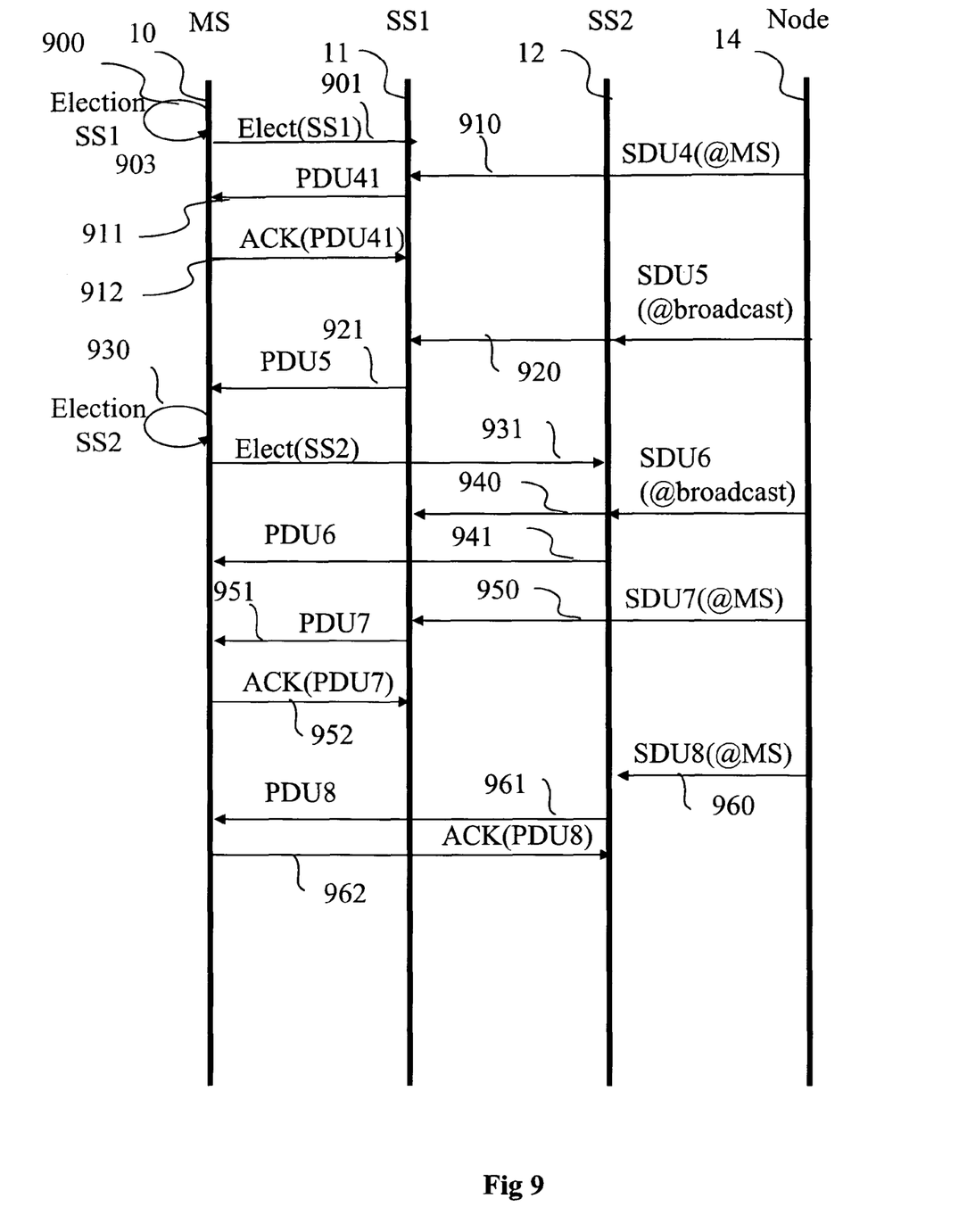

FIG. 9 illustrates an example of communication between the master station 10, the slave stations 11 and 12 (noted respectively SS1 and SS2) and the node 14 considered as the source.

After an election 900 of SS1 by the master station, the station transmits a message 901 broadcast to all the SSs associated with the master station, and particularly the stations SS1 and SS2 by informing them of its election.

Then, the master station elects SS2 and transmits a dedicated message 931 broadcast to all the SSs associated with the master station, and particularly the stations SS1 and SS2.

Then, the node 14 transmits a message 910 comprising an SDU noted SDU4 addressed to the master station. This message is relayed by the switch 16 to SS1, that the switch considers as a relay point to the master station.

SS1 receives the message 910 and splits this message into PDU. Each PDU is then transmitted in a dedicated message 911 to the master station, each of the messages 911 being acknowledged by the master station. If a message 911 is not acknowledged, it is retransmitted.

Then, the node 14 transmits a message 920 comprising an SDU noted SDU5 of the broadcast type. This message is relayed by the switch 16 to the two stations SS1 and SS2.

SS1 and SS2 receive the message 920. Only the elected station SS1 splits this message into PDUs. Each PDU is then transmitted by SS1 in a dedicated message 921 to the master station. According to the embodiment described, the PDUs from broadcast messages are not acknowledged. According to a variant, its messages are acknowledged by the master station on the wireless link and retransmitted if the acknowledgement is not received by the SS having transmitted the PDU or PDUs. SS2 throws away SDU5 without transmitting it.

Then, the master station elects SS2 and transmits a dedicated message 931 broadcast to all the SSs associated with the master station, and particularly the stations SS1 and SS2.

Next, the node 14 transmits a message 940 comprising an SDU noted SDU6 of the broadcast type. This message is relayed by the switch 16 to the two stations SS1 and SS2.

SS1 and SS2 receive the message 940. Only the elected station SS2 splits this message into PDUs. Each PDU is then transmitted by SS2 in a dedicated message 941 to the master station. SS1 throws away SDU6 without transmitting it.

Then, the node 14 transmits a message 950 comprising an SDU noted SDU7 addressed to the master station. This message is relayed by the switch 16 to SS1, that the switch still considers as a relay point to the master station.

SS1 receives the message 950 and splits this message into PDU. Each PDU is then transmitted in a dedicated message 951 to the master station, each of the messages 951 being acknowledged by the master station.

Then, the node 14 transmits a message 960 comprising an SDU noted SDU8 addressed to the master station. This message is relayed by the switch 16 to SS2, that the switch henceforth considers as a relay point to the master station.

SS2 receives the message 960 and splits this message into PDU. Each PDU is then transmitted in a dedicated message 961 to the master station, each of the messages 961 being acknowledged by the master station.

Naturally, the invention is not limited to the aforementioned embodiments.

In particular, the architecture of the mobile stations and master stations can be different from those illustrated in FIGS. 2 and 3, in the respective function and/or form of the elements (the functions of the electronic elements can notably be grouped into a restricted number of components or, on the contrary, expanded into several components) and their layout.

The invention is not limited to an architecture as described with respect to FIG. 1 but involves any architecture implementing a wireless network with local (for example a few tens of metres) or remote (for example a few kilometres according notably to a standard IEEE 802.16) coverage with one or more SS, each SS being connected at any time to at least one MS. According to one variant, the link between the SSs and/or between the SSs and the source node is a wireless link (local or remote link).

The invention can also be applied with different communication protocols than the ones described previously. Hence, the application and/or control data can be transmitted according to any protocol (for example with a contention access or in scheduled mode with polling) on the wireless links. The communication channels between the SS and the MS can use the same frequency channels for the upward and downward directions (mode known as "half duplex") or different frequency channels (mode known as "full duplex"). The network or the links connecting the source to the SSs can also be unremarkable and is not limited to an Ethernet network. This means, for example, a standardised or proprietary protocol, wired or wireless enabling the data transmission from the source to each of the SSs.

Moreover, the packets (SDU) transmitted by a source to the subscriber stations are advantageously and not necessarily split into small packets (PDU) of MAC level. The frontiers between SDU and PDU coincide or do not coincide according to the embodiments of the invention, an SDU being able to contain one or more PDUs.

The architecture of the master station is also not limited to the examples previously described. In particular, according to different embodiments, the application part of the master station (for example, data processing unit (notably voice and/or images), a camera control unit, etc.) can be integrated in an item of equipment comprising the radio and communication management part on the wireless link with the slave stations, or, on the contrary, separated completely or partly from this item of equipment. According to a particular embodiment, the application part of the master station is in a separate device from the communication part with the SSs: for example, the MS receives a video flow transmitted on Ethernet (or on a different wired or wireless link, following a standard protocol or proprietor) to a digital recorder, a screen or a computer.

Likewise, the architecture of the slave stations is also not limited to the examples previously described. In particular, according to different embodiments, the data source (for example, data processing unit (notably voice and/or pictures), an application control unit associated with the master station or stations, etc.) can be integrated in an item of equipment comprising the radio and communication management part on the wireless link with the master station, or, on the contrary, separated completely or partly from this item of equipment.

According to an embodiment variant of the invention, an SS can be temporarily removed from the SS sub-set communicating with the MS (if, for example the wireless link is poor, the wired link being maintained) reintroduced subsequently (for example when the link becomes satisfactory) after a re-association operation.

According to a variant of the invention aiming to accelerate the association process, the master station transmits to all the slave stations information that comprises at least one part of the characteristics of the radio links (for example, frequencies) by means of a slave station with which it can communicate (and advantageously the elected station). The slave station receiving this information transmits it to the other slave stations via the wired network or any other link.

According to a variant, the elected station transmits to the slave stations an item of information representative of its election, while itself receives the election message informing it of its election. This enables all the slave stations, and particularly the last elected station, to know the newly elected station.

According to another variant, the elected station transmits to the switch an item of information representative of its election, while itself receives the election message informing it of its election. This enables the switch to route the SDUs to the new elected station more rapidly.

According to some embodiments of the invention, the communications between a master station and slave stations are carried out on the same channel (for example with the same frequency). According to variants, these communications use distinct channels (for example of different frequencies). According to another variant, the communications between a master station and the slave stations are carried out on several physical channels with, for example, distinct frequencies, which notably enable a large bitrate to be obtained by using commercially available components. In this case, the master station can manage the different channels in a dependent or, on the contrary, an independent manner: according to different embodiments, the master station elects a single slave station for all the channels or it elects for each channel a slave station, two distinct slave stations being able to be elected (for example to account for the capacity of each slave station or of the communication quality with each of the slave stations for each channel in a similar manner to that which is described above for network 1).

The invention claimed is:

1. A method of communication in a network comprising a mobile wireless master station and a plurality of wireless slave stations, data being transmitted from the master station to a remote station via one of the slave stations, the method being implemented by the master station, wherein the method comprises:
   a polling of the presence of at least two slave station (SSe, SSe') for associating said at least two slave stations (SSe, SSe') to the master station,
   a first election of a first slave station (SSe) among the associated slave stations (SSe, SSe') by the mobile master station, then
   a transmission of a first message to the associated slave stations (SSe, SSe'), the first message informing the associated slave stations (SSe, SSe') of the election of the first slave station (SSe),
   a queuing in a first queue of data packets intended for the remote station, the first queue being associated with the first slave station,
   a first transmission of at least one data packet present in the first queue, the first transmission being carried out from the master station to the first slave station,
   a second election of a second slave station (SSe') among the associated slave stations (SSe, SSe') by the mobile master station, then
   a transmission of a second message to the associated slave stations (SSe, SSe'), the second message informing the associated slave stations (SSe, SSe') of the election of the second slave station (SSe'),
   a queuing in a second queue of data packets intended for the remote station, the second queue being associated with the second slave station,
   a second transmission of at least one data packet present in the second queue, the second transmission being carried out from the master station to the second slave station and the first transmission continuing as long as the first queue is not empty.

2. The method according to claim 1, further comprising a selection one of the slave stations for an election according to a predetermined criterion.

3. The method according to claim 1, further comprising:
   a reception by the master station of an item of information representative of the reception quality of radio frames transmitted by the master station and received by at least one slave station,
   a comparison of the information received, and
   an election of a slave station, the elected slave station corresponding to the best reception quality.

4. The method according to claim 1, further comprising:
a determination by the master station of an item of information representative of the reception quality of radio frames transmitted by at least one slave station and received by the master station,
a comparison of the information received, and
an election of a slave station, the elected slave station corresponding to the best reception quality.

5. The method according to claim 1, wherein the data packets are of the MAC level and are compatible with the IP protocol.

6. The method according to claim 1, wherein data packets transmitted from the master station are broadcast to the slave stations.

* * * * *